United States Patent [19]
Capilli et al.

[11] Patent Number: 4,860,730
[45] Date of Patent: Aug. 29, 1989

[54] AIR-WARMING UNIT

[76] Inventors: Sergio Capilli, 19 Via Ottavilla; Anna D. Capilli, 607 Via Aurelia, both of, Rome, Italy

[21] Appl. No.: 104,153

[22] Filed: Oct. 5, 1987

[30] Foreign Application Priority Data

Apr. 29, 1987 [IT] Italy .................. 47894 A/87

[51] Int. Cl.⁴ ............................................. F24J 3/02
[52] U.S. Cl. ............................... 126/450; 126/428; 126/429
[58] Field of Search ............. 126/450, 419, 429, 432, 126/428

[56] References Cited

U.S. PATENT DOCUMENTS

| | | | |
|---|---|---|---|
| 3,968,652 | 7/1976 | Chevalier | 126/438 X |
| 4,015,584 | 4/1977 | Habermann | 126/438 X |
| 4,212,288 | 7/1980 | Lipinski | 126/428 |
| 4,249,512 | 2/1981 | Rivetti et al. | 126/429 X |
| 4,254,636 | 3/1981 | Zebuhr | 126/430 X |
| 4,465,058 | 8/1984 | Reick | 126/429 |
| 4,676,272 | 6/1987 | Jackson | 126/429 X |

Primary Examiner—Larry Jones
Attorney, Agent, or Firm—Henry C. Nields

[57] ABSTRACT

Apparatus for using solar energy to transport or heat the air within a structure is disclosed. The apparatus includes a chamber defined by a recipient element attached to a hull-like shaped absorbent element. The chamber includes entrance and exit apertures in fluid communication with the air within a structure by means of valves, which regulate the flow of fluid in and out of said apertures. A thrust-reducing support system is also provided to compensate for various external forces.

16 Claims, 7 Drawing Sheets

FIG. 2a
FIG. 2b
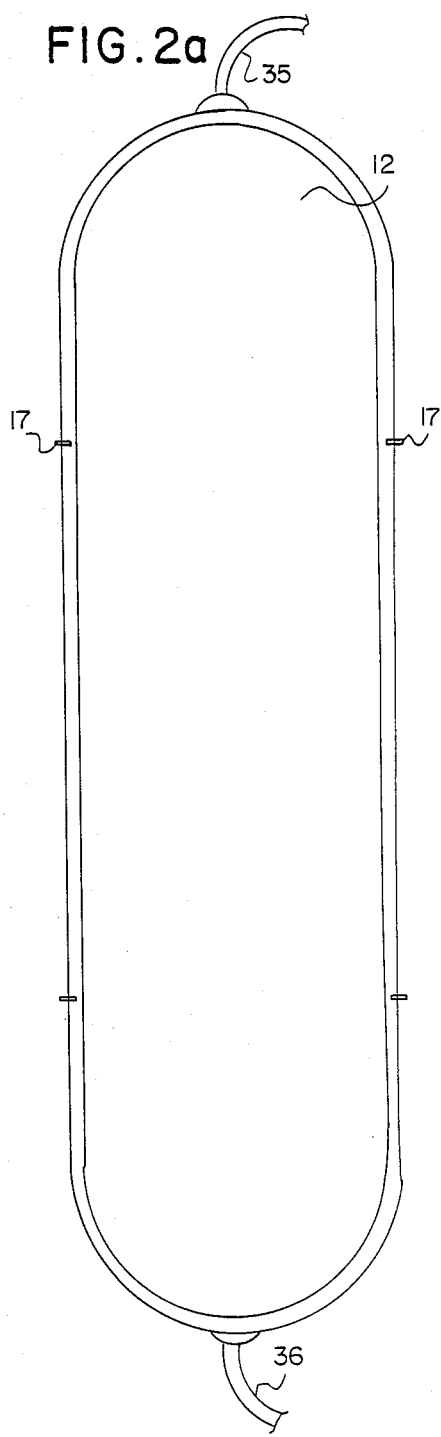
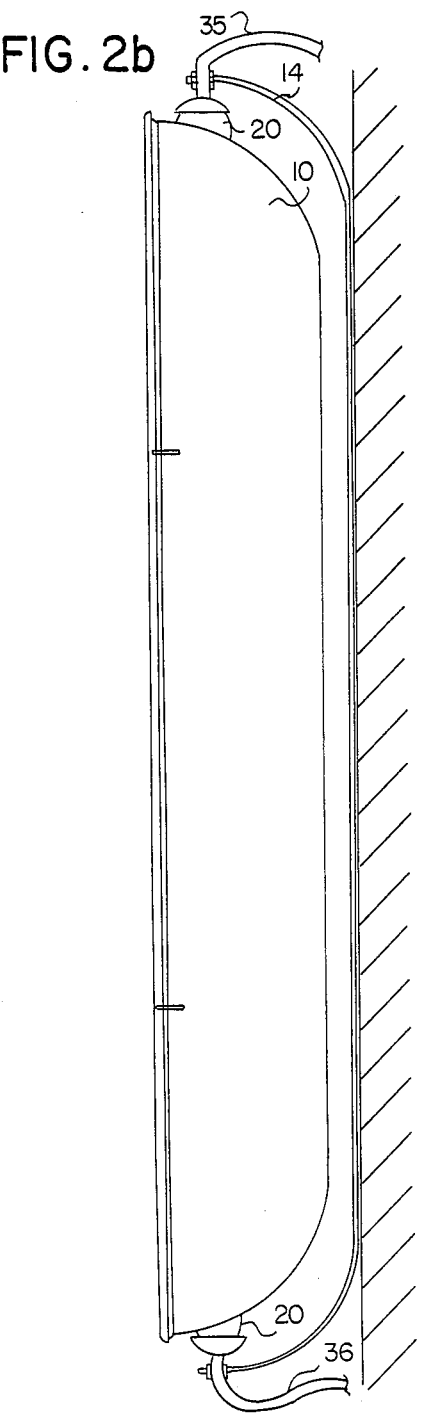

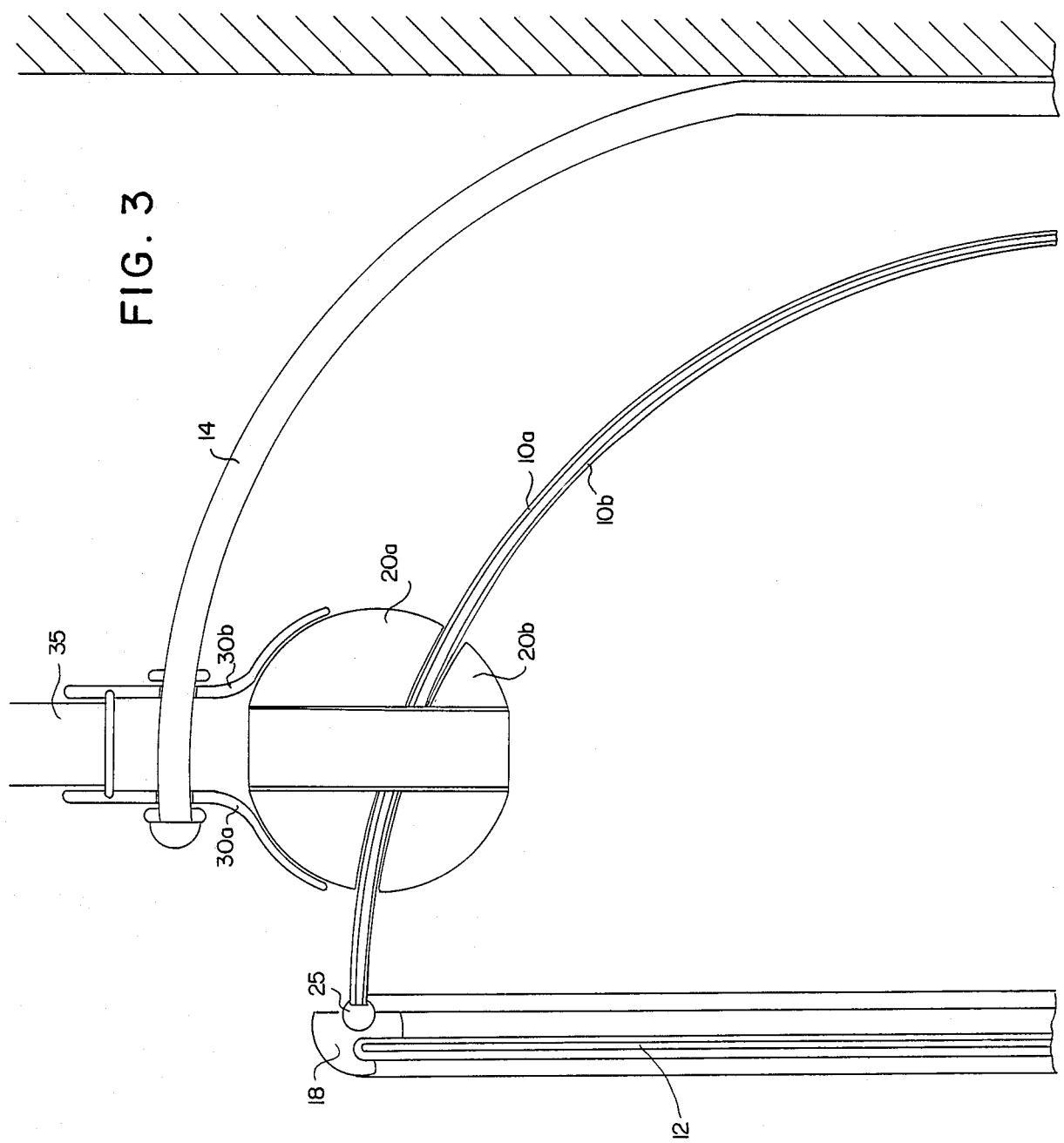

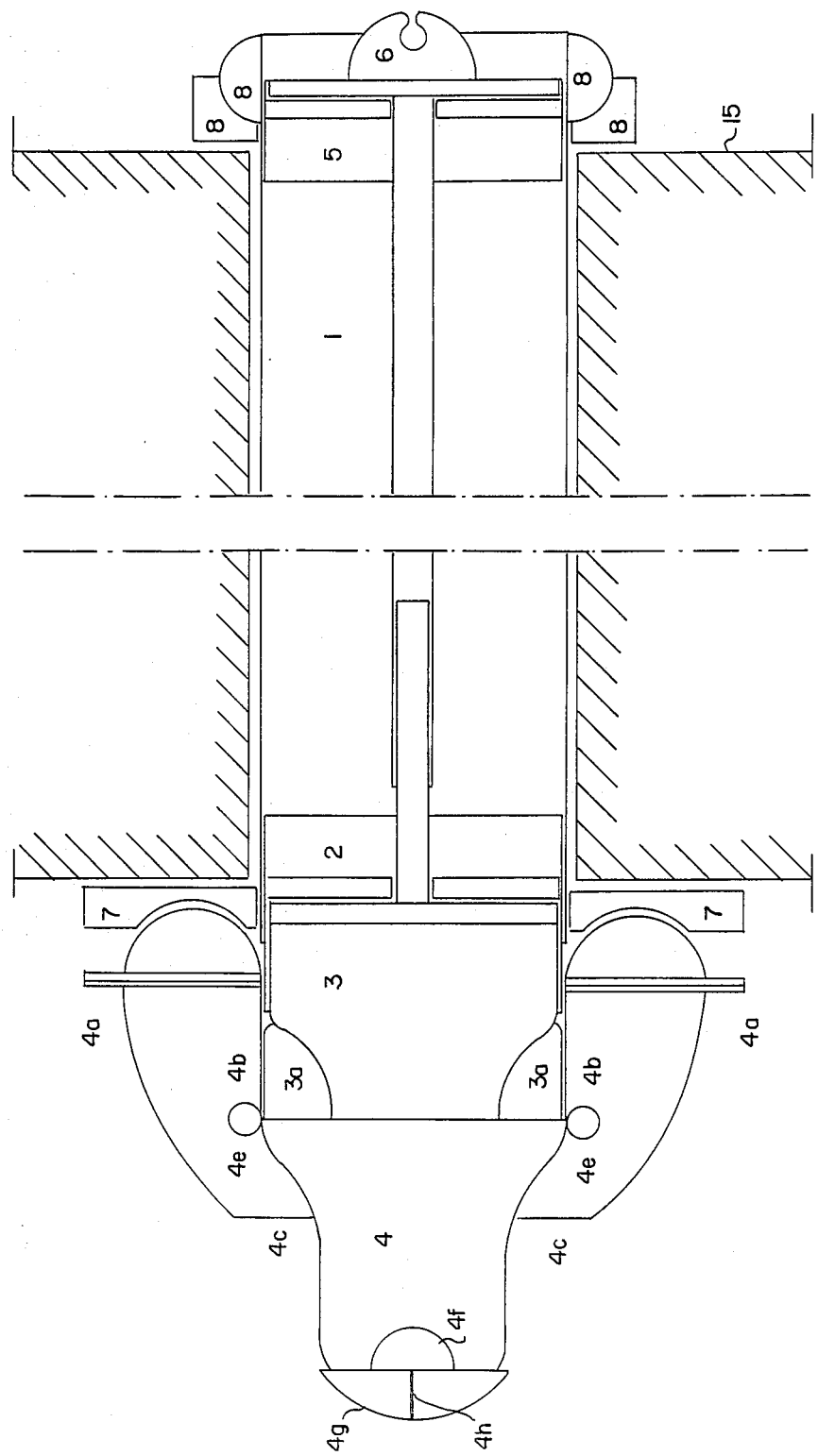

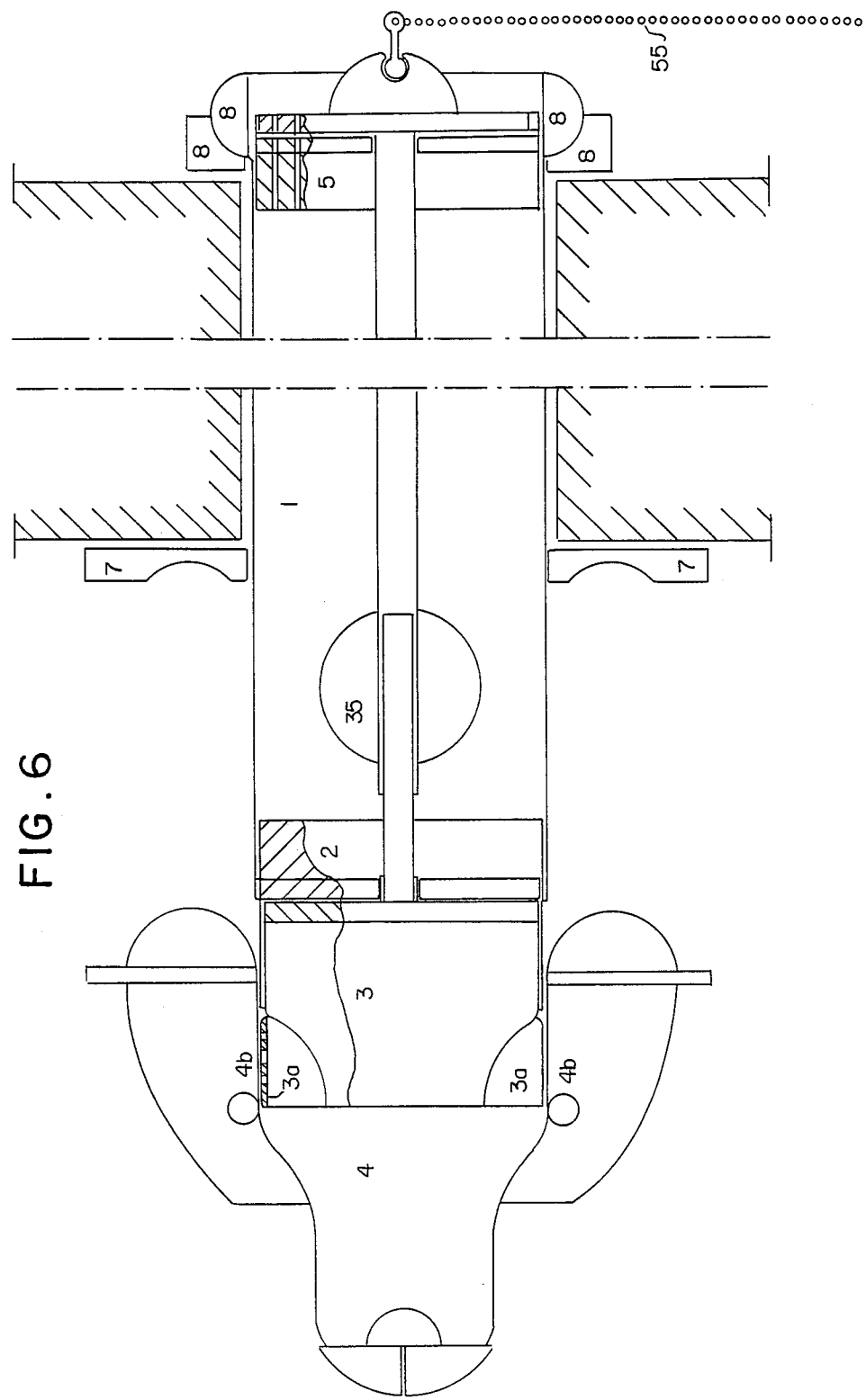

AIR-WARMING UNIT

BACKGROUND OF THE INVENTION

1. Field of the Invention

This invention utilizes solar energy, based on the greenhouse effect, in order to produce hot air both for heating and for ventilation.

2. Description of the Prior Art

Solar collectors of various configurations are well known in the prior art. Some use air as the heat transfer fluid and can thereby serve as a ventilation system in addition to functioning as a heating system.

For example, U.S. Patent No. 4,396,004 to Koenig discloses a solar collector having venting means to the outer atmosphere as well as pipes communicating with the interior of a building. The upper and lower manifolds of the collector can each communicate with the exterior atmosphere through wide slots which can be sealed by inflatable elastic tubes. In cold weather, both slots can be sealed. In this mode air is drawn from the building into the collector, heated, and forced back into the building. In warm weather the upper slot is opened, and the lower slot is either vented, in which case air is drawn into the collector from both the atmosphere and the building, or sealed, in which case air is drawn only from the house. The sealing of the slots is accomplished with elongated inflatable sealing tubes.

U.S. Patent No. 4,078,603 to Saunders discloses a complex solar heat control device capable of transferring solar heat to or diverting it away from a heat transfer fluid. A valve control is provided for selecting the desired mode depending on the time of year.

SUMMARY OF THE INVENTION

The device of the present invention functions as an economic air-warming unit and air conditioning system, and can be integrated with existing heating/cooling systems in a building or house for use in the summertime or wintertime.

The device includes a chamber which may be installed on an exterior wall in any simple manner by even an inexperienced homeowner. The chamber includes a recipient element and an absorbent element. The recipient element is transparent to the visible radiation from the sun and permits that radiation, which carries much of the sun's energy, to reach the absorbent element. The absorbent element then re-radiates the energy as infrared radiation, to which the recipient element is opaque. This is the socalled "greenhouse effect", and warms the air in the chamber. The device also includes two valves which may be located separate from the chamber and serve to regulate both the temperature and the ventilation of the interior space. The absorbent element has a hull-like shape which allows an extensive absorbent surface in relation to the surface area of the recipient element and surrounds a volume of air that, because of the small section of the inlet and outlet pipes, does not escape quickly and therefore increases in temperature. The resulting thermic inertia, greater than that of the usual flat solar energy panels, along with the free rotation of the chamber, allow the devices to function practically without interruption not only for heating purposes but also, as already mentioned, for summer and winter ventilation.

It is therefore an object of the present invention to provide a solar energy device that is inexpensive, efficient and economical to operate.

It is another object of the present invention to provide a solar energy device of the air flow type which utilizes the greenhouse effect.

It is a further object of the present invention to provide a solar energy device having valves to regulate the temperature and ventilation of the interior of a building or house.

It is a still further object of the present invention to provide a solar energy device capable of variable orientation.

These and other objects of the invention will become apparent upon reference to the following specification and drawings.

BRIEF DESCRIPTION OF THE DRAWINGS

FIGS. 2a and 2b are front and side views, respectively, of the chamber of the present invention;

FIG. 3 is a side view of the thrust reducing structure of the present invention;

FIG. 4 is a longitudinal section view of a static aspirator (or valve) of the present invention;

FIG. 6 is a longitudinal sectional view of the upper valve of the present invention shown with the lateral insertion of a flexible pipe.

DETAILED DESCRIPTION OF THE INVENTION

Figure 1:
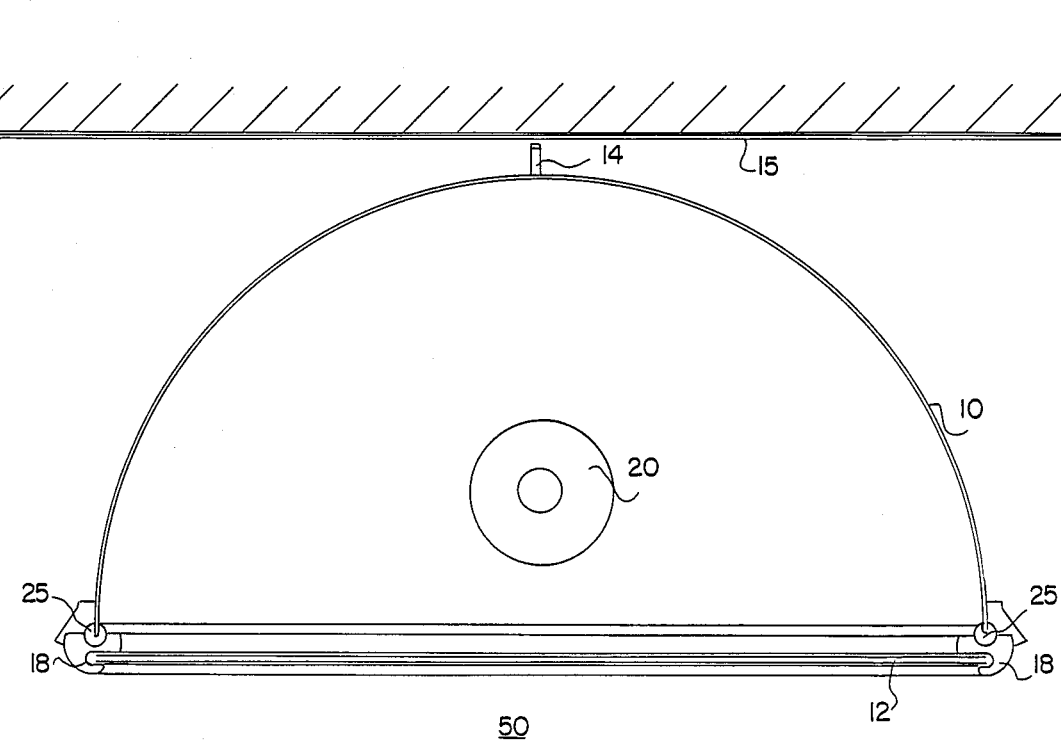
FIG. 1 is a top view of the chamber of the present invention shown attached to an exterior wall.

Referring now to FIGS. 1, 2a and 2b, the solar energy device of the present invention comprehends a chamber 50 which includes a partially deformable stackable body 10 as the absorbent element, and a glass panel 12 as the recipient element. The glass panel 12 is highly transparent to visible radiation, but less transparent to infrared radiation, so as to be suitable for production of the so-called "greenhouse effect". The stackable nature of the body 10 allows for efficient storage and transportation of the body. Its partially deformable nature is consistent with the expansion characteristics which occur when heat is absorbed. Radiation from the sun is received through the recipient element 12 and absorbed by the absorbent element 10. The hull-like shape of the absorbent element 10 provides a greater absorbing surface area per unit area of the recipient element, which allows for the more efficient use of solar energy. Air enters the chamber 50 through an inlet pipe 36 at the bottom thereof and leaves the chamber 50 through an outlet pipe 35 at the top thereof. Said inlet pipe and outlet pipe each have the construction shown at 35 in FIG. 3. The volume of the chamber 50 thus defined is large relative to the small section of the inlet pipe 36 and outlet pipe 35. Thus the volume of air which at any given time is being heated in the chamber 50 does not escape quickly, and thereby increases in temperature to a greater degree than would otherwise occur with a less efficient configuration. The chamber 50 is supported upon a flexible pipe 14, such as a metal pipe, by means of ball-shaped elements 20 which permit rotation of the chamber 50 about a vertical axis with respect to the pipe 14. The pipe 14, in turn, is attached to the exterior wall 15 of the building or house the interior air of which is to be controlled. The pipe 14, ball-shaped elements 20, and partially deformable body 10 act together with a gasket 25 and gasket receiving element 18 as thrust-reducing supports in the presence of external factors such as thermal deformation, wind gusts, and accidental shocks, as discussed in detail below.

FIG. 3, which is a close-up of a support system shows in vertical section the element 10 as an assembly of two sheets 10a and 10b. The exterior 10a is made either of plastic material or of enamelled or porcelained steel sheet, and the interior 10b of insulating material coated by a steel sheet. Both are attached along the edge by a gasket 25 which can be made of a resilient material able to support high temperatures, such as rubber. This gasket 25 keeps the warmed air inside and, together with the gasket receiving element 18, absorbs the differences of deformation along the edge between the body 10 which is partially deformable and the glass 12 which is rigid. FIG. 3 also shows the pipe 14, the ball-shaped member 20 made of the same resilient material as the gasket 25, and the embedding support socket-member comprising elements 30a and 30b, which, taken together, are the thrust-reducing supports. The two hemispheres 20a and 20b of the ball-shaped member 20 are fastened to the absorbent element 10 and to each other by a pipe which allows the air to flow through. The socket-member which is molded in two equal pieces of plastic material 30a and 30b and is joined to the pipe 14 by a nut, holds at one end the flexible outlet pipe 35, for example, which is connected to a valve (not shown) and at the other the joint 20, which can rotate around an ideal and vertical axis.

After attaching the pipe 14 to the wall 15, fastening the superior and inferior sphere to the body, and joining the socket-member to the pipe, the final operation required is to install the two parts 30a ad 30b of the socket-member in order to embed the ball-shaped member. The recipient surface 12 is subsequently fastened to the body with two pairs of lateral fasteners 17 (FIG. 2a) and can be removed for ordinary cleaning.

The air inside the device 50 and that of the interior space are connected by means of upper and lower valves, which derive from the static aspirator shown in FIG. 4, and flexible pipes 35 and 36.

FIG. 4 shows in longitudinal section a static aspirator obtained mainly by insertion of elements made of polyester resin reinforced with glass fibers. The circular section of the tubular member 1 is in a hole previously made in the wall 15. A mobile exterior perforated element 3 is provided having at one end a disk-like element having holes matching those of fixed perforated element 2, which allows the air to flow. Mobile perforated element 3 also has screened openings 3a which can be aligned with opposite opening 4b to provide fluid communication between the aspirator and the outside environment. An aspiration and air mixing item, generally depicted as 4, is formed by assembling two parts along the lateral ring 4a. In the presence of wind the element 4 has the function of guaranteeing the regularity of the air flow toward the exterior. To this end, windbreaker element 4d is a device which offers minimal resistance to the flow of air toward the exterior, yet creates turbulence in the flow of the atmospheric wind motion and impedes the flow of air from the exterior to the interior. To accomplish this effect, thin flat fins 4g ad 4h can be provided, arranged in line with the outward flow. The fins can also function as a support for the bowl-like member 4f. The member 4f is positioned in element 4 so as to impede air flow from the exterior by having a hollow hemisphere-like shape and by partially blocking the opening at the end of element 4 and thereby defining a ring-like opening, and is aerodynamically dimensioned so as to provide minimal resistance to the air flow from the interior to the exterior through the ring-like opening. Thus the direction of air flow is from 4c, around rubber ring 4e which assures fluidity through 4c to 4d, and out the ring-like opening in element 4 and through fins 4h and 4g. This occurs because of the superior pressure in the area of windbreaker 4d. In the absence of wind the air flow causes an induced depression in the element 4b and an aspiration of exterior air.

An interior mobile perforated element 6, connected to the mobile perforated element 3 by a rod is provided, having holes which match a fixed interior perforated element 5, and is supported in wall 15 with finishing gaskets 7 and 8.

The operation of the aspirator is as follows: The open-close maneuver of the perforated elements 5 and 6 and 2 and 3 is synchronous but, on the contrary, that of the screened opening (3a) and the opposite opening (4b) is asynchronous with that of the perforated elements. Specifically, when perforated elements 5 and 6 are opened, (that is, the holes are aligned to permit air flow), perforated elements 2 and 3 are also opened. However, the screened openings 3a and opposite openings 4b are closed. Similarly, if perforated elements 5 and 6 are closed, perforated elements 2 and 3 are also closed, but screened openings 3a and opposite openings 4b are opened.

Figure 5:
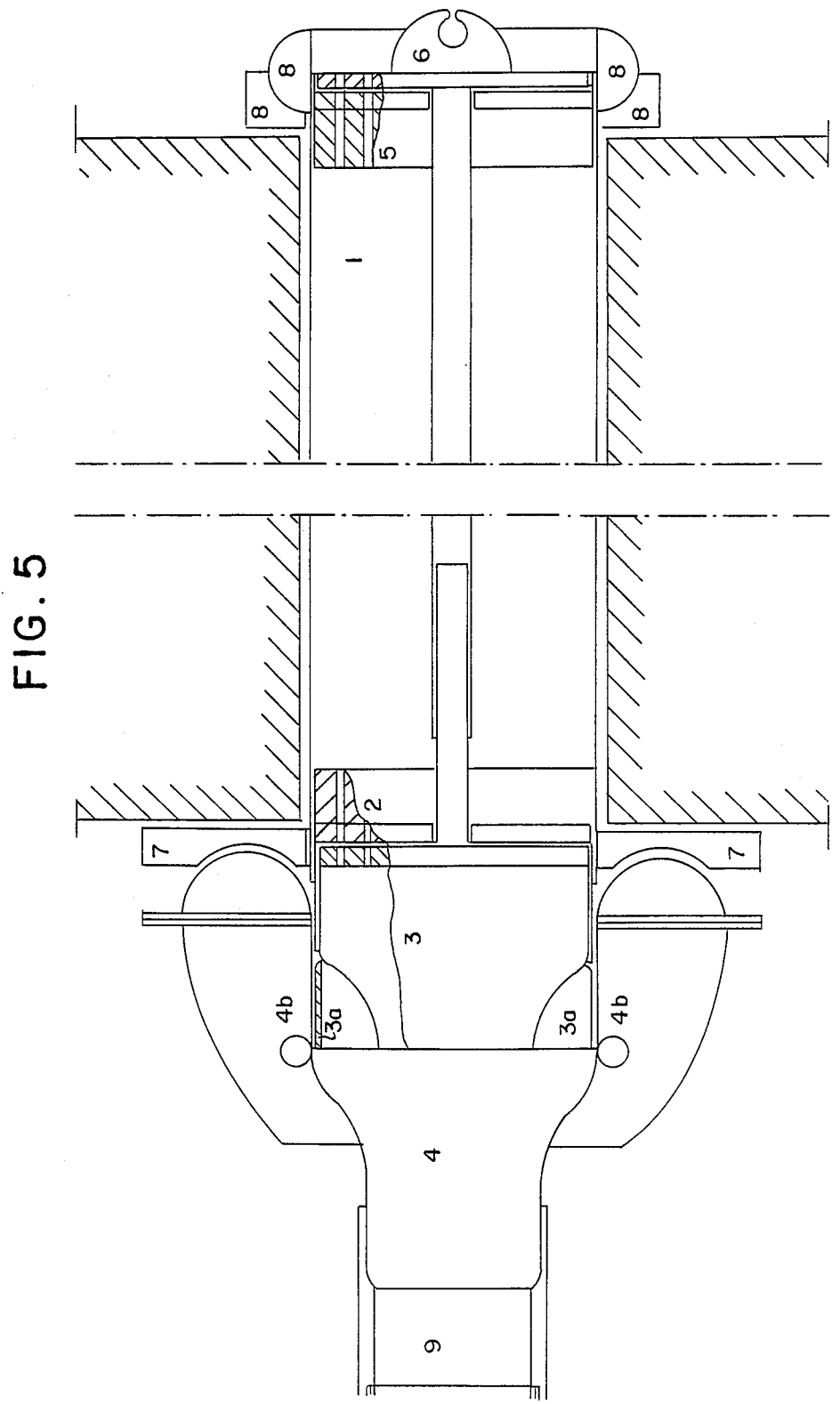
FIG. 5 is a longitudinal sectional view of the lower valve shown linked to the chamber of the present invention.

FIG. 5 shows in longitudinal section, the static aspirator in its application as the lower valve linked to the chamber 50 (not shown) with the connection 9 and the flexible pipe 36 (not shown). The rotation of the mobile perforated element 6, because of the previously mentioned asynchronism, goes from complete opening or exclusive connection between the interior space and the body, to complete closure, or isolation of the interior. The positions in the middle permit partial alignment of the holes on the respective perforated elements, and thereby allow a variable mixture of the interior and exterior air before the entrance into the device. Thus, in every case there always exists an aspiration either of mixed air or of exterior air or of interior air.

FIG. 6 shows the static aspirator as the upper valve, modified with the lateral insertion of the flexible pipe 35 on the tubular member 1. The operation of the upper valve is such that the flexible pipe 35 is inserted between perforated elements 2 and 3 and 5 and 6. By this configuration, the upper valve guarantees either the exit of the flow to the exterior or the entrance to the interior, as a result of the position of the perforated elements 5 and 6 and 2 and 3, which in this case are asynchronous. Thus when elements 5 and 6 are opened, 2 and 3 are closed, and vice versa. The position of openings 3a and 4b are not critical in this valve. FIG. 6 also shows a chain assembly 55 attached to element 6 as a means for operating the valve. The combinations of opening and closure of both the lower and upper valve determine the four main working positions as shown in FIG. 7.

Figure 7D:
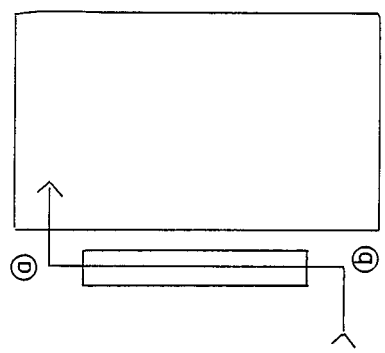
FIGS. 7a, 7b, 7c and 7d show the various modes of operation of the device of the present invention.
Figure 7C:
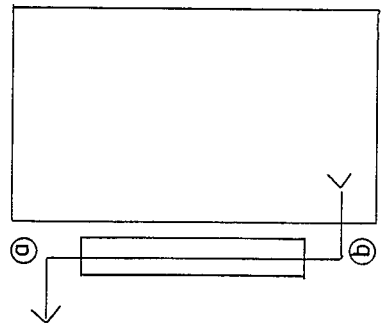
Figure 7B:
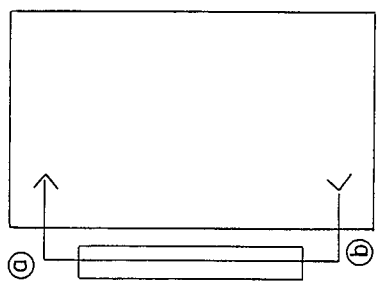
Figure 7A:
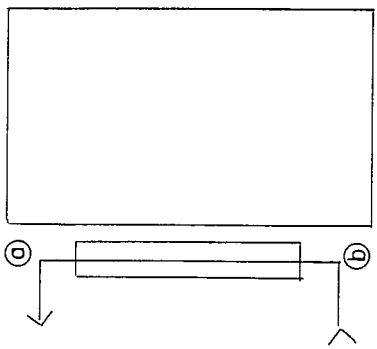

FIG. 7a shows the idle position or complete isolation of the unit from the interior with an exterior-exterior circulation. FIG. 7b is the interior air-warming position. A simple rotation of the upper valve (a) in FIG. 7b achieves the ventilation position in FIG. 7c. Ventilation occurs only at the lower part of the interior without remotion of warmed air when another hole is made at the same level. In every condition of exterior pressure created by the wind the aspiration in the upper valve (a) makes the direction of the flow constant and nocturnal ventilation easier. When both valves are turned in the opposite direction, the situation shown in FIG. 7b occurs. The input of fresh warmed air obtains a continuous ventilation (but in the opposite direction to that in FIG. 7c) with a possible caloric addition, especially when there is a hole at floor level. The result is that it is possible to modify both the temperature and/or the ventilation of interiors until the desired corrections are obtained, either maneuvering the valves of one unit or combining the performances of two or more of these units.

What is claimed:

1. In apparatus for using solar energy to transport or heat the air within a structure, which apparatus includes a chamber for heating air by solar energy having entrance and exit apertures, the improvement comprising a radiation recipient element for said chamber; a radiation absorbent element for said chamber comprising two sheets of metal and insulating material therebetween shaped so as to form a stackable and deformable body; a rubber gasket around the edge of said body to hold said sheets together; and a gasket receiving element around the edge of said radiation recipient element and shaped to receive said rubber gasket; said rubber gasket and gasket receiving element cooperating to absorb the differences of deformation along the edge between said deformable body and said radiation recipient element.

2. In apparatus for using solar energy to transport or heat the air within a structure, which apparatus includes a chamber for heating air by solar energy having entrance and exit apertures and a thrust-reducing support for said chamber affixed to said structure, the improvement comprising at least one ball-member made of resilient material and having a surface contoured to be attached to a surface of said chamber, and having a tubular aperture therethrough for the passage of air, said ball-member being mounted on a socket-member so as to form a ball-and-socket joint attached to and forming part of said thrust-reducing structure.

3. Apparatus according to claim 2, wherein said thrust-reducing structure includes a flexible pipe affixed to said structure.

4. In apparatus for using solar energy to transport or heat the air within a structure; which apparatus includes a chamber for heating air by solar energy having a lower entrance aperture and an upper exit aperture, whereby air within said chamber will tend to flow upwards as a thermal current upon being heated by solar energy, said structure having a passageway therethrough (between said entrance aperture and the interior of said structure) the improvement comprising a valve for controlling the flow of air into said entrance aperture, said valve including a tubular member mounted in said passageway, said tubular member forming an axial conduit through which (when open) air is drawn from within said structure into said chamber by said thermal current, the wall of said tubular member having a circumferential aperture at a location outside said structure through which (when open) air is drawn from the atmosphere outside said structure into said chamber by said thermal current, first means adapted to open and close said axial conduit, and second means adapted to open and close said aperture, or partially to open both said axial conduit and said aperture.

5. Apparatus according to claim 4, wherein said first means includes at least one pair of disk-like elements having perforations which may be lined up to coincide or lined up to block one another by rotation of at least one of said disk-like elements, and wherein said second means includes a pair of cylindrical elements (connected to at least one of said rotatable disk-like elements) having perforations which are lined up to coincide or lined up to block one another depending upon whether the perforations of the disk-like elements are in the blocked or coincident positions, respectively.

6. Apparatus according to claim 4, including a shield to impede flow of air from said axial conduit outward through said circumferential aperture.

7. Apparatus according to claim 4 including guide means to direct air flowing towards said structure into said circumferential aperture.

8. Apparatus according to claim 4, wherein said structure has a second passageway therethrough (between said exit aperture and the interior of said structure), and wherein said improvement includes a second valve for controlling the flow of air from said exit aperture, said second valve including a second tubular member mounted in said second passageway and extending outward of said structure, said second tubular member forming an axial conduit, said second tubular member having a lateral aperture at a location outside said structure connected to said upper exit aperture so that air is pushed from said chamber into said axial conduit by said thermal current, said lateral aperture dividing said axial conduit into an outer portion in communication with the atmosphere outside said structure and an inner portion in communication with the interior of said structure, third means adapted to open and close said inner portion and fourth means adapted to open and close said outer portion, or partially to open both of said portions.

9. In apparatus for using solar energy to transport or heat the air within a structure, which apparatus includes a chamber for heating air by solar energy having a lower entrance aperture and an upper exit aperture, whereby air within said chamber will tend to flow upwards as a thermal current upon being heated by solar energy, said structure having a passageway therethrough (between said exit aperture and the interior of said structure), the improvement comprising a valve for controlling the flow of air from said exit aperture, said valve including a tubular member mounted in said passageway and extending outward of said structure, said tubular member forming an axial conduit, said tubular member having a lateral aperture at a location outside said structure connected to said upper exit aperture so that air is pushed from said chamber into said axial conduit by said thermal current, said lateral aperture dividing said axial conduit into an outer portion in communication with the atmosphere outside said structure and an inner portion in communication with the interior of said structure, first means adapted to open and close said inner portion and second means adapted to open and close said outer portion, or partially to open both of said portions.

10. Apparatus according to claim 9, wherein said first means includes at least one first pair of disk-like elements having perforations which may be lined up to coincide or lined up to block one another by rotation of at least one of said disk-like elements, and wherein said second means includes a second pair of disk-like elements (connected to at least one of said rotatable disk-like elements) having perforations which may be lined up to coincide or lined up to block one another depending upon whether the perforations of the first pair of disk-like elements are in the blocked or coincident positions, respectively.

11. Apparatus according to claim 9 including a windbreaker, said windbreaker comprising means for creating turbulence in the flow of the atmospheric wind motion and impeding the flow of air from the outside atmosphere into said outer portion, and means imparting minimal resistance to air flowing in the direction from inside said outer portion to the outside atmosphere.

12. In apparatus for using solar energy to transport or heat the air within a structure, which apparatus includes a chamber for heating air by solar energy having entrance and exit apertures, said structure having a passageway therethrough between said chamber and the interior of said structure, a valve element comprising in combination
- a tubular member mounted in said passageway and extending outward of said structure,
- a first perforated disk at one end of said tubular member,
- a second perforated disk at the other end of said tubular member,
- each of said disks having a central aperture,
- a rod supported within said tubular member within said central apertures, a third perforated disk at that end of said rod which is adjacent said first perforated disk so as to form, with said first perforated disk, a first disk pair,
- a fourth perforated disk at that end of said rod which is adjacent said second perforated disk so as to form, with said second perforated disk, a second disk pair, and means for rotating said rod so that the perforations of each pair may be lined up for varying degrees of restriction of air flow therethrough.

13. A valve element according to claim 12, wherein said perforations are so arranged that when one disk pair is in the coincident position the other disk pair is in the blocked position.

14. A valve element according to claim 12, wherein said perforations are so arranged that when one disk pair is in the coincident position the other disk pair is also in the coincident position.

15. Apparatus according to claim 12, wherein said valve element includes a pair of cylindrical elements (connected to at least one of said rotatable disk-like elements) having perforations which are lined up to coincide or line up to block one another depending upon whether the perforations of at least one of said disk pairs is in the blocked or coincident positions, respectively.

16. A valve element according to claim 12 further comprising a tubular extension integral with said tubular member, said tubular extension having an end terminating in a windbreaker, said windbreaker comprising means for creating turbulence in the flow of the atmospheric wind motion and impeding the flow of air from the outside atmosphere into said end of said tubular extension, and means imparting minimal resistance to air flowing in the direction from inside said tubular extension to the outside atmosphere.

* * * * *